United States Patent
Marantz et al.

[15] 3,669,880
[45] June 13, 1972

[54] RECIRCULATION DIALYSATE SYSTEM FOR USE WITH AN ARTIFICIAL KIDNEY MACHINE

[72] Inventors: Laurence B. Marantz, Sherman Oaks; Michael A. Greenbaum, Los Angeles, both of Calif.

[73] Assignee: CCI Aerospace Corporation, Van Nuys, Calif.

[22] Filed: June 30, 1969

[21] Appl. No.: 837,714

[52] U.S. Cl. .................................210/22, 210/29, 210/37, 210/38, 210/195, 210/321
[51] Int. Cl. ....................B01d 13/00, C02b 1/56, C02b 1/42
[58] Field of Search...................210/321, 22, 195, 29, 38, 37

[56] References Cited

UNITED STATES PATENTS

| | | | |
|---|---|---|---|
| 3,268,441 | 8/1966 | Lindstrom | 210/22 |
| 3,332,737 | 7/1967 | Kraus | 210/37 X |
| 3,406,826 | 10/1968 | Willock | 210/321 X |
| 3,416,664 | 12/1968 | Kumme et al. | 210/321 X |
| 3,471,136 | 4/1969 | Serfass et al. | 210/321 X |
| 3,463,728 | 8/1969 | Kolobow et al. | 210/321 X |
| 3,474,907 | 10/1969 | Cary et al. | 210/321 X |
| 3,479,280 | 11/1969 | Boissevain | 210/321 X |
| 3,484,369 | 12/1969 | Dobbeleer | 210/321 X |
| 3,506,126 | 4/1970 | Serfass et al. | 210/321 X |
| 3,527,700 | 9/1970 | Goldhaber | 210/22 |

OTHER PUBLICATIONS

Industrial Research Fellow Report May, Flower, Chemical Engineer, May 1968, pp. 120–130.
Large Scale Herodialysis, Leonard, Vol. XI, Trans. Amer. Soc. Artificial Organs, pp. 25–30, 1965.
Rosenbaum et al., Trans. Amer. Soc. Artificial Int. Organs, Vol. XIII, 1967, pp. 183–189.
Amphlett et al., Synthetic Inorganic Ion Exchange Materials, Journal Inorg. Nucl. Chem. Vol. 6, 1958 pp. 220–235.
Blaney et al., Cyclie . . . . Fluid, Chemical Engineering Progress Symposium, 1968 pp. 112–120.

*Primary Examiner*—Reuben Friedman
*Assistant Examiner*—Richard Barnes
*Attorney*—Robert E. Geauque

[57] ABSTRACT

A recirculating dialysate system for use with an artificial kidney in which the total volume of dialysate solution is controlled. After leaving the artificial kidney, the urea in the solution is removed in a zirconium phosphate column containing urease and the other waste products are removed in a carbon column containing activated carbon and hydrated zirconium oxide. The solution passes through the dialysate reservoir (or container) where it was originally introduced and where the level of solution indicates the amount of fluid removed from the body. Downstream of the dialysate reservoir, the solution is reconstituted by the addition of magnesium and calcium (removed in the zirconium phosphate column) so that these substances will not be removed from the blood in the kidney. The rate at which water passes from the blood into the dialysate solution can be controlled by controlling the pressure of the dialysate solution on the dialysate side of the kidney membrane, so that sufficient water can be removed to arrive at water balance in the patient.

11 Claims, 3 Drawing Figures

LAURENCE B. MARANTZ
MICHAEL A. GREENBAUM
INVENTOR.

BY R. E. Geanger
ATTORNEY

LAURENCE B. MARANTZ
MICHAEL A. GREENBAUM
INVENTOR.

BY R. E. Geauque
ATTORNEY

RECIRCULATION DIALYSATE SYSTEM FOR USE WITH AN ARTIFICIAL KIDNEY MACHINE

BACKGROUND OF THE INVENTION

This invention relates to a recirculating dialysate system for use with an artificial kidney. In order to save a patient with acute Renal failure or kidney failure which results from loss of kidney function due to disease or poison or massive shock, it has been the practice to utilize an artificial kidney until the natural kidneys can take over and resume functioning. Normally, after a certain period of dialyzing, the kidneys will commence functioning again. With chronic Renal failure, the kidneys slowly deteriorate until they stop functioning altogether or function at such a low level that they are insufficient for the patient's needs. In most cases, the kidney deterioration is over a period of years and eventually becomes acute enough that the patient must have the aid of dialysis or he will die. At the present time, the amount of funds required to produce the necessary equipment and support for patients is so great as to prevent treatment and prevent the death of all inflicted persons. As a result, a large number of candidates for dialysis die which could otherwise be saved if there were facilities available for dialysis.

It has been proposed to add urease to a recirculating dialysate solution and pass the solution through a zirconium phosphate column in order to eliminate from the solution the urea which has been removed from the blood of the patient by the artificial kidney. This treatment of the dialysate solution is fully disclosed in copending application Ser. No. 780,417, filed Dec. 2, 1968 now continuation Ser. Number 92,864 filed Nov. 25, 1970, by the same inventors.

SUMMARY OF THE INVENTION

In a complete dialysate system it is necessary to consider components of the blood in addition to urea, and the effect of dialysis on the blood. The present invention provides a complete recirculating dialysis system for use with an artificial kidney which eliminates toxic substances from the dialysate solution and continually maintains a normal dialysate solution. The dialysate system can be used with various types of artificial kidneys now available and the system is small and inexpensive so that it can be made available to a great number of people who would presently go without treatment.

It is therefore an object of the present invention to provide a complete recirculating dialysate system which will remove toxic substances from the dialysate solution and provide for the continual maintenance of a normal dialysate solution.

Another object of the invention is to provide a complete recirculating dialysate system which controls the fluid balance of the patient so that the required amount of water is removed from the blood to keep the patient in normal health and water balance.

Another object of the invention is to provide a small and inexpensive dialysate system which will be available to the greatest number of people, the majority of whom must now go without treatment.

Another object of the invention is to provide a complete recirculating dialysate system which is self-contained and needs no outside additions once the dialyzing process is started.

DESCRIPTION OF THE PREFERRED EMBODIMENT

Figure 1:
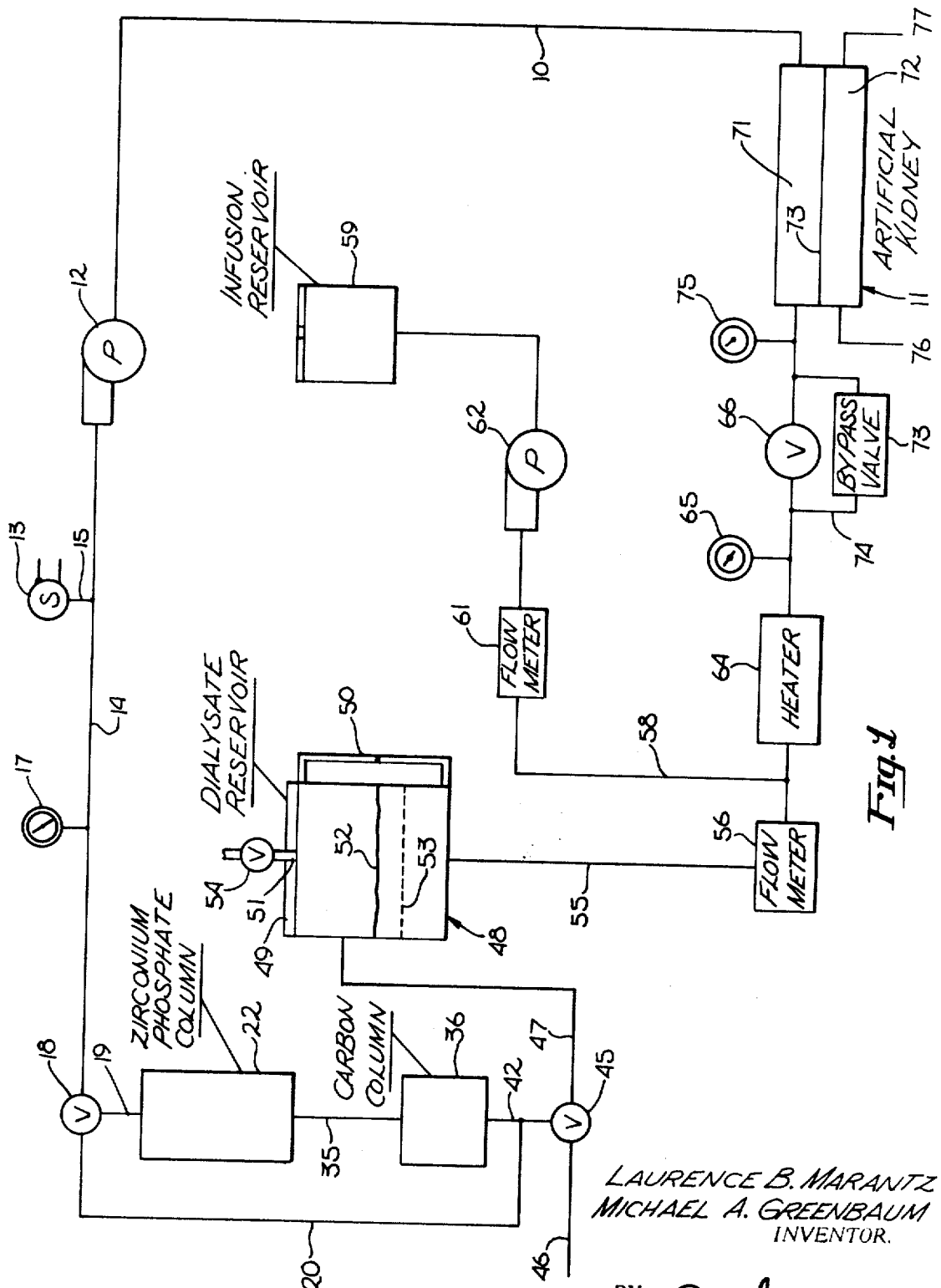
FIG. 1 is a diagrammatic illustration of the complete recirculating dialysate system connected with an artificial kidney.
Figure 2:
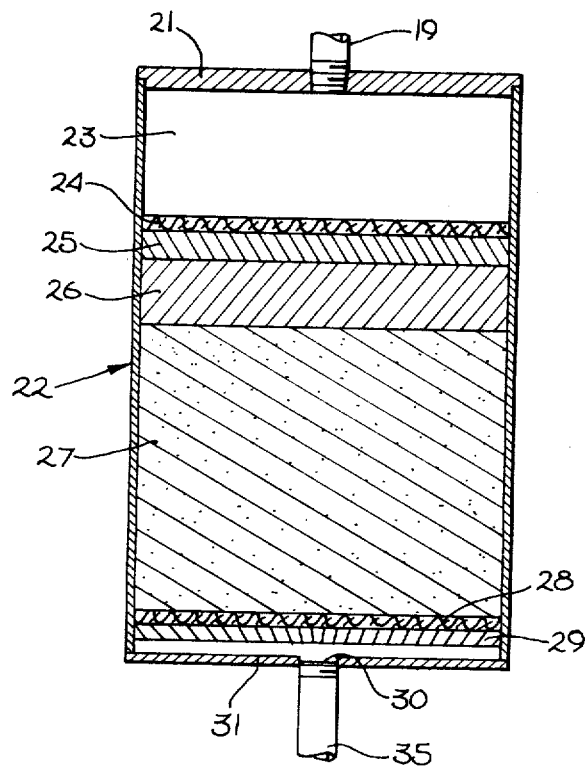
FIG. 2 is an enlarged sectional view of the zirconium phosphate column.
Figure 3:
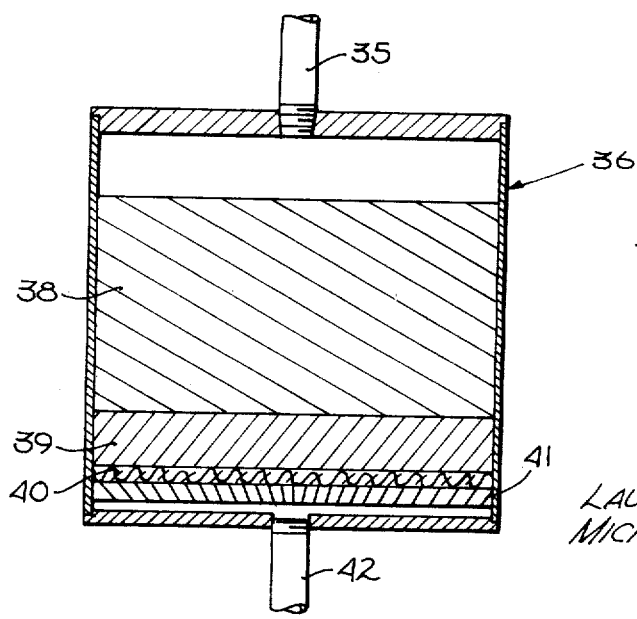
FIG. 3 is an enlarged sectional view of the carbon column.

Referring to FIG. 1, passage 10 connects to the discharge side of an artificial kidney device 11 and contains a gear pump 12 for continually recirculating the dialysate solution through the system. The term "dialysate solution" as used herein refers to the solution used throughout the dialysis process, whether the solution is entering or leaving the artificial kidney. A pressure shut-off switch 13 is connected to output line 14 of the pump through a pipe 15 and serves to stop the pump if the pressure in passage 14 exceeds a predetermined value determined by the pressure which can be withstood by the components of the system. Passage 14 is also connected to a cartridge pressure gauge 17 which indicates the pressure in line 14 upstream of a three-way valve 18 which connects line 14 to branch line 19 or to the by-pass line 20. The valve 18 can also be placed in a middle position to completely close the line 14 and stop circulation of the system. Line 19 leads through the top panel 21 of zirconium phosphate column 22 to an open space 23. At the bottom of the space is a sheet 24 of filter cloth which covers a layer 25 consisting of mixture of finely divided urease and diatomaceous earth. The filter cloth keeps the incoming flow from breaking up the top surface of the layer 25. Immediately below the layer 25 is a layer 26 of diatomaceous earth which prevents the urease from moving down in the column. A layer 27 of zirconium phosphate in fine particle form is located below the layer 26 of diatomaceous earth. The substance of layers 25 and 26 can be essentially fine enough to be called dust. Another filter cloth 28 is located between the zirconium phosphate 27 and a flow director device 29 which directs the dialysate flow to outlet opening 30 in the bottom plate 31 of the column, connecting with the outlet line 35.

The solution in passage 14 is the standard dialysate solution plus the waste products (impurities) picked up from the patient by the artificial kidney 11. These impurities will include urea, creatinine and uric acid. As the dialysate solution passes through the layer 25 of urease in column 22, the urea is converted into ammonia carbonate in accordance with the following relationship:

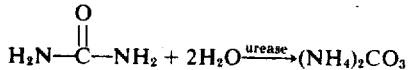

In proper operation, substantially all of the urea is converted by the time the solution enters the zirconium phosphate layer 27. For instance, the incoming solution in passage 19 can contain 20 milligrams per 100 cc of blood urea nitrogen and will drop to 1 or 2 milligrams as it enters the zirconium phosphate 27. After leaving the urease, there will be no further change in the urea concentration. The layer 26 of diatomaceous earth takes out all colloidal and particle matter which is in the dialysate solution and prevents its continual circulation in the system.

In flowing through the zirconium phosphate, the ammonium ion is picked up and is replaced by sodium and hydrogen so that the ammonium concentration in the outlet line 35 is substantially zero. This reaction is as follows: $2NH_4^+ + Zr(NaPO_4)_2 \cdot H_2O \rightarrow Zr(NH_4PO_4)_2 \cdot H_2O + 2Na^+$ and $\rightarrow ZrO(NH_4NaPO_4)_2 + 2H^+$ Thus, in the outlet passage 35, the urea concentration has been reduced to 1 or 2 milligrams per 100 cc and the ammonium ion concentration is substantially zero. It should be noted that the solution in passage 19 and in passage 35 is substantially 99 percent water. It is understood that the term "zirconium phosphate" utilized throughout the specification loosely defines zirconium phosphate ion exchangers, such as the zirconium phosphate sodium form set forth in the above equation, and it is understood that other forms of zirconium phosphate ion exchangers can be utilized. The composition of zirconium phosphate ion exchanger is more fully discussed in said U.S. Application Ser. No. 780,417 (now No. 92,804). It is known that zirconium phosphate ion exchanger, not equilibrated with potassium, strongly absorbs potassium ions and thus, layer 27 will remove potassium from the dialysate solution. If the potassium form of zirconium phosphate ion exchanger is utilized in layer 27 the potassium content of the dialysate can be controlled.

The line 35 connects with carbon cartridge or column 36 which contains a layer 38 of activated carbon over a layer 39 of hydrated zirconium oxide. A sheet of filter cloth 40 is located between the layer 39 and a flow director 41 which has vanes to direct the flow to outlet line 42. The activated carbon picks up uric acid and creatinine, as well as other organic waste which are obtained by the artificial kidney from the patient. The layer 39 of zirconium oxide picks up phosphate from the solution, the phosphate coming in part from the patient and in part from the zirconium phosphate.

The by-pass line 20 connects passage 14 with outlet passage 42 when valve 18 is properly positioned so that line 20 bypasses both the zirconium phosphate column 22 and the carbon cartridge 36. The purpose of by-pass line 20 is to permit the complete dialysate system to fill with liquid after start up since the pump cannot pump air originally in the line through the column and cartridge. Once the system is filled with liquid, the valve 18 is turned to direct the flow through the column 22. The passage 42 leads to three-way valve 45 which can direct the solution either to the dump line 46 or to the line 47 leading to the dialysate reservoir (container) 48.

The dialysate solution is added to the reservoir (container) 48 prior to treatment of the patient by removing the cover 49 and the level of the solution can be read by the level gauge 50. The air release port 51 in cover 49 permits air to escape when it is left open during the treatment. Also, the port can be equipped with a valve 54 to permit a vacuum or a pressure to be applied within the container 48 as will be later explained. The original level of the solution before the start of the dialysis is designated as 52 and the level will drop to level 53 as the rest of the system fills with fluid from the reservoir. As water is pulled out of the patient during the dialysis, the water level will rise again. A flow meter 56 measures the rate of flow of the recirculating dialysate solution produced by pump 10 in passage 55.

An infusion flow line 58 connects the line 55 with an infusion reservoir 59 which contains a dialysate reconstitution solution of substances, such as magnesium and calcium salt. The line 58 contains infusion pump 62 and infusion meter 61 to control the rate at which the reconstitution solution is added to the line 55. The magnesium and calcium are in the normal dialysate solution placed in reservoir 48 but are removed by the layer 27 of zirconium phosphate in column 22 and therefore must be returned to the dialysate solution before it again enters the artificial kidney 11. The concentration of these substances is controlled in a water solution in the infusion reservoir 59 and can be controlled to meet the condition of the patient. In a standard addition, the infusion flow is at a rate to add 2.5 milliequivalents of calcium and 1.5 milliequivalents of magnesium per liter of dialysate solution. The reconstituted dialysate solution then passes through heater 64 which brings the temperature of the dialysate solution up to normal body temperature and this temperature can be measured by the gauge 65 for purposes of control.

An ultra filtration valve 66 is located in passage 55 and consists of a standard regulating valve which controls the pressure of the fluid in the dialysate chamber 71 of the artificial kidney. Since the speed of the pump controls the flow rate, the closing down of valve 65 will cause the pump 12 to pull a vacuum in chamber 71. The artificial kidney contains a semi-permeable membrane 73, such as cellophane, which separates the dialysate side 71 from the blood chamber 72. Blood from the patient enters chamber 72 from line 77 and leaves the chamber 72 by line 76 so that there is counterflow between the blood and dialysate solution. The membrane 73 contains small molecular size holes through which small molecules can pass and large molecules cannot, the normal critical size being about 10,000 molecular weight. The smaller the molecules are, the faster they pass through the membrane and the formed elements of the blood, such as cells (erythrocyte and leucocyte) cannot pass so that there is no loss of blood cells or protein through the membrane during dialysis. On the other hand, such molecules as water, inorganic salts, urea, creatinine, uric acid, amino acids, glucose, citric acid, etc., will pass through the membrane into the dialysate solution.

The passage of water through the membrane is controlled almost entirely by the pressure gradient across the membrane as determined by the setting of the valve 66. The blood pressure in chamber 77 corresponds with the blood pressure of the patient which is substantially 100 mm. or 4 psi and the pressure of the dialysate solution upstream of valve 66 is determined by the pressure in dialysate reservoir 48. If the air relief port 54 is open, the pressure will be atmospheric. However, either a vacuum or a pressure can be imparted to the interior of reservoir 48 and the air relief valve closed before circulation of the dialysate solution in order to vary its pressure. A pressure in reservoir 48 would only be utilized when it is desired to stop water removal from the patient during dialysis and in such case the water gauge 50 would indicate no change in volume. A lower pressure in the chamber 71 causes fluid to pass from the blood through the membrane into the dialysate solution at a greater rate. A standard check valve 73 is located in by-pass line 74 around valve 66 so that before valve 66 is closed down far enough to cause a pressure drop sufficient to rupture the kidney membrane, the check valve will open. The pressure in the dialysate side 71 is continually shown at the dialysate pressure gauge 75. A higher pressure in the chamber 71 causes fluid to pass from the blood through the membrane into the dialysate solution at a lower rate. Assuming that the air release valve 54 is open, it is possible to obtain a pressure on the opposite side of the membrane ranging from atmospheric to a few pounds below atmosphere through use of valve 66. It is understood that the rate of transfer through the membrane can also be controlled by adjustment of the blood pressure (such as in the Kolff coil system) rather than adjustment of the dialysate pressure since it is the pressure gradient that is controlling.

The normal human kidney is responsible for the water balance in the body and removes such water from the blood as is not lost by other means. The effectiveness of the artificial kidney in removing water to maintain the balance is determined by the pressure differential which is set across the membrane. As the water is taken out of the blood by the artificial kidney, it is added to the closed dialysate system and shows up as an addition to the system at the level gauge 50. One advantage of the system is that if the air release hole 51 is closed during the circulation of the dialysis solution, a break in the kidney membrane cannot remove more blood from the patient then will fill the remaining space in the reservoir and this amount of blood removal will not be enough to kill the patient.

In addition to the removal of water, other impurities in the blood, such as urea, creatinine, uric acid and other unknown toxic materials, must also be removed and these are removed at a rate controlled by dialysate flow. The patient has a certain calcium and magnesium level in his body and if these materials are not in the dialysate solution when it flows past the artificial kidney 11, the calcium and magnesium in the patient's blood flows through the membrane into the dialysate solution and will be subsequently removed at layer 27. Therefore, the patient would be depleted of calcium and magnesium if it were not for the continual addition of these substances to the dialysate solution downstream of layer 27. It would be possible to reconstitute the blood to compensate for loss of these substances by injection of these substances directly into the blood stream at the line leading from the kidney. However, the injection would require sterile operating conditions and is not practical or economical.

In summarizing the operation of the system, the dialysate solution in passage 10 leaving the artificial kidney 11 contains the various impurities removed by the artificial kidney, such as urea, creatinine and uric acid and the normal dialysate components, including the magnesium and calcium that were added at the infusion line 58. In passing through the zirconium phosphate column 22, all the urea is removed from the solution along with the magnesium and calcium that had been added by the infusion line 58. Thereafter, in passing through the carbon column 36 the impurities uric acid, creatinine and other organic wastes are removed by the activated carbon, and the hydrated zirconium oxide removes the phosphate. Hydrous zirconium oxide is synonymous with hydrated zirconium oxide and is further described in U.S. Pat. No. 3,332,737 granted July 25, 1967 to Kent A. Kraus. The solution then is reconstituted by the addition of magnesium and calcium at the infusion line 58 so that a normal dialysate solution is again available in line 55 for introduction into the dialysate chamber 71 of the artificial kidney.

The flow rate of the solution through the kidney is controlled by pump 12 and the pressure and temperature of the solution at the artificial kidney can be controlled by the valve 66 and heater 64, respectively. By varying the pressure of the dialysate solution in the kidney chamber 71, it is possible to control the rate at which water is removed at the kidney in order to maintain the water balance of the patient. The present invention provides a dialysate system for use with an artificial kidney in which the total volume of the dialysate solution is strictly controlled and an immediate measure of the fluid removed from the patient is available. The total volume of dialysate solution need only be that required to fill the artificial kidney and system components, which volume depends upon the volume required to fill the particular type of artificial kidney employed. In the typical example given in Application Ser. No. 780,417 (now Ser. No. 92,864) two liters of dialysate solution circulating at 200 cc per minute effectively removes urea. Compared with the volume of dialysate solution, the volume of fluid removed from the patient is sufficient to provide a reading of volume increase of solution.

The continual infusion into the dialysate solution of magnesium and calcium assures that these materials will not be removed from the bloodstream. The use of this reconstitution system makes it possible to treat each patient according to his varying body chemistry without the necessity of making up large volumes of special dialysate for individual patients. Thus, with a standard reconstitution solution, it is a simple matter to handle all levels of calcium and magnesium balance simply by varying the rate of infusion of this reconstitution solution. Patients requiring addition of special inorganic or organic substances to their bodies could have this done simply by adding these materials at appropriate levels to the reconstitution solution.

We claim:

1. In a method of treating a recirculating dialysate solution which flows past a membrane to pick up impurities from a patient's blood, comprising the steps of:
    treating the dialysate solution with urease to convert urea picked up by the dialysate solution to ammonium carbonate;
    treating the dialysate solution with a zirconium phosphate ion exchanger to remove ammonium ions from the ammonium carbonate;
    treating the dialysate solution with hydrated zirconium oxide to remove phosphate picked up by the dialysate solution; and
    treating the dialysate solution with activated carbon to remove other waste materials picked up by the dialysate solution.

2. In a method as defined in claim 1, the step of adding calcium and magnesium to said dialysate solution after treatment with said zirconium phosphate ion exchanger and before flow past said membrane.

3. In a method as defined in claim 1, the step of continually measuring the increase in volume of said dialysate solution to determine the amount of fluid removed from the patient.

4. In a dialysis apparatus which includes a dialysate recirculating system for directing a dialysate solution past a membrane to pick up impurities from a patient's blood,
    urease in said recirculating system for converting the urea picked up by said dialysate solution to ammonium carbonate;
    zirconium phosphate ion exchanger in said recirculating system for removing ammonium ions from the ammonium carbonate;
    hydrated zirconium oxide in said recirculating system for removing phosphate picked up by said dialysate solution, and
    activated carbon in said recirculating system for removing other waste substances picked up by said dialysate solution.

5. In a dialysis apparatus as defined in claim 4 having gauge means associated with said system for continually measuring the amount of fluid removed from said patient during dialysis by continually measuring the increase in solution volume in said system.

6. In a dialysis apparatus as defined in claim 4, a supply of calcium and magnesium for addition to said system to replace calcium and magnesium removed by said zirconium phosphate ion exchanger.

7. In a recirculating dialysate system containing a dialysate solution for receiving phosphate from an artificial kidney, a charge of hydrated zirconium oxide in the dialysate solution to remove phosphate, and means recirculating the dialysate solution from a phosphate receiving location in the artificial kidney through said charge and back to said phosphate receiving location.

8. In a method of treating a dialysate solution which picks up phosphate at an artificial kidney, the improvement comprising treating the dialysate solution with hydrated zirconium oxide to remove the phosphate from the solution, and recirculating the treated dialysate solution back to the artificial kidney.

9. In a recirculating dialysate system utilizing a dialysate solution flowing past a membrane for dialysis of a patient:
    passage means for directing dialysate solution to said membrane;
    pump means in said passage means for recirculating said dialysate solution;
    means in said passage means for removing impurities from said dialysate solution added during dialysis;
    said removing means comprising urease and zirconium phosphate ion exchanger for removing urea, hydrated zirconium oxide for removing phosphate, and activated carbon for removing other toxic substances;
    said zirconium phosphate ion exchanger also removing calcium and magnesium from the dialysate solution required for dialysis;
    means connected with said passage means for reconstituting the dialysate solution before dialysis with calcium and magnesium required for dialysis and removed by said zirconium phosphate ion exchanger.
    said reconstituting means comprising a reservoir containing calcium and magnesium in solution; and means for directing said reconstituting solution into said dialysate solution.

10. In a recirculating dialysate system as defined in claim 9, container means connected with said passage means for receiving the increase in volume of the dialysate solution resulting from fluid removal from the patient during dialysis; and
    means associated with said container means for continually measuring said increase in volume during dialysis.

11. In a recirculating dialysate system as defined in claim 10, wherein said measuring means comprises a liquid level gauge.

* * * * *